(12) United States Patent
Alizadeh et al.

(10) Patent No.: US 11,184,265 B2
(45) Date of Patent: Nov. 23, 2021

(54) INTER-PROTOCOL INTERFERENCE REDUCTION FOR HIDDEN NODES

(71) Applicant: Cisco Technology, Inc., San Jose, CA (US)

(72) Inventors: Ardalan Alizadeh, San Jose, CA (US); Gautam Dilip Bhanage, Milpitas, CA (US); Benjamin Jacob Cizdziel, San Jose, CA (US); Khashayar Mirfakhraei, Los Altos, CA (US); Matthew Aaron Silverman, Shaker Heights, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 16/655,065

(22) Filed: Oct. 16, 2019

(65) Prior Publication Data
US 2021/0119893 A1 Apr. 22, 2021

(51) Int. Cl.
| | |
|---|---|
| *H04L 12/26* | (2006.01) |
| *H04W 72/08* | (2009.01) |
| *H04W 52/24* | (2009.01) |
| *H04L 29/14* | (2006.01) |
| *H04W 84/12* | (2009.01) |

(52) U.S. Cl.
CPC .......... *H04L 43/0835* (2013.01); *H04L 69/40* (2013.01); *H04W 52/243* (2013.01); *H04W 72/082* (2013.01); *H04W 84/12* (2013.01)

(58) Field of Classification Search
CPC ..... H04L 43/0835; H04L 69/40; H04L 5/006; H04L 5/0094; H04L 63/08; H04L 69/18; H04W 52/243; H04W 72/082; H04W 84/12; H04W 52/143; H04W 16/14; H04W 72/0453; H04W 52/60; H04W 74/085
See application file for complete search history.

(56) References Cited

U.S. PATENT DOCUMENTS

| | | | |
|---|---|---|---|
| 5,450,616 A | * | 9/1995 | Rom ..................... H04W 52/60 455/69 |
| 9,019,846 B2 | | 4/2015 | Shaffer et al. |
| 9,955,357 B2 | | 4/2018 | Moon et al. |
| 2006/0203841 A1 | * | 9/2006 | Fischer .................. H04L 69/18 370/461 |

(Continued)

FOREIGN PATENT DOCUMENTS

CN 110351885 B * 10/2020

OTHER PUBLICATIONS

Lagen, Sandra, et al. "New Radio beam-based Access to Unlicensed Spectrum: Design Challenges and Solutions" Centre Tecnologic de Telecomunicacions de Catalunya (CTTC/CERCA), Barcelona, Spain; InterDigital Communications, Inc., Melville, New York, USA; arXiv:1809.10443v1 [cs.NI] Sep. 27, 2018, 18 pages.

*Primary Examiner* — Ayaz R Sheikh
*Assistant Examiner* — Louis Samara
(74) *Attorney, Agent, or Firm* — Merchant & Gould P.C.

(57) ABSTRACT

Inter-protocol interference reduction for hidden nodes may be provided. A first service end point may determine that an inter-protocol interference is present on a channel. Next, an initial packet failure count value on the channel may be determined. A transmit (Tx) power for selected packets may then be increased until a subsequent packet failure count value on the channel is less than the initial packet failure count value.

20 Claims, 5 Drawing Sheets

(56) References Cited

U.S. PATENT DOCUMENTS

| | | | |
|---|---|---|---|
| 2010/0246489 A1* | 9/2010 | Yang | H04L 5/0094 370/328 |
| 2014/0086081 A1* | 3/2014 | Mack | H04L 5/006 370/252 |
| 2015/0195781 A1* | 7/2015 | Yi | H04W 52/143 455/452.2 |
| 2017/0132423 A1* | 5/2017 | Johnson | H04L 63/08 |
| 2017/0202019 A1* | 7/2017 | You | H04W 16/14 |
| 2017/0272345 A1* | 9/2017 | Viorel | H04W 16/14 |
| 2017/0290058 A1 | 10/2017 | Singh et al. | |
| 2020/0037357 A1* | 1/2020 | Chu | H04L 1/0004 |
| 2020/0314906 A1* | 10/2020 | Goyal | H04B 7/0695 |
| 2021/0051717 A1* | 2/2021 | Xue | H04W 74/0808 |

* cited by examiner

INTER-PROTOCOL INTERFERENCE REDUCTION FOR HIDDEN NODES

TECHNICAL FIELD

The present disclosure relates generally to the coexistence of heterogeneous wireless technologies.

BACKGROUND

Long-Term Evolution-Unlicensed (LTE-U) is an adaptation of the LTE standard that operates in unlicensed frequency bands. As currently defined by the 3$^{rd}$ Generation Partnership Project (3GPP), LTE-U targets 5 GHz and other unlicensed frequency bands. In addition, other unlicensed wireless wide area networks, including Licensed Assisted Access (LAA) and MulteFire, also use frequency bands in the 5 GHz range. As a consequence, LTE-U, LAA, Multe-Fire, and other unlicensed wireless wide area network technologies, operate in some of the same frequency bands defined for the Electrical and Electronic Engineers (IEEE) 802.11 standard (e.g., the 5 GHz frequency bands). The spectrum overlap between unlicensed wireless Wide Area Networks (WANs) and Wi-Fi can present spectrum access and interference problems for Wi-Fi and wireless access points for LTE-U, LAA, MulteFire, etc. that are concurrently operating within the transmission range of each other in a given geographical region.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Inter-protocol interference reduction for hidden nodes may be provided. A first service end point may determine that an inter-protocol interference is present on a channel. Next, an initial packet failure count value on the channel may be determined. A transmit (Tx) power for selected packets may then be increased until a subsequent packet failure count value on the channel is less than the initial packet failure count value.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

New Radio in Unlicensed band (NR-U) has been approved by the 3rd Generation Partnership Project (3GPP) in Release 16 of the standard specification, which supports both the existing 5 GHz unlicensed band as well as a new 6 GHz unlicensed band. Based on this standard specification, gNodeBs (gNBs) and User Equipment (UE) (e.g., client devices) may be able to use Wi-Fi channels while meeting the transmit (Tx) power and Dynamic Frequency Selection (DFS) channel requirements. Although 3GPP has not mandated a certain Clear Channel Assessment Energy Detect (CCA-ED) threshold in the specification and left it open based on regulations of each country, several evaluation results have been provided to validate the coexistence of Wi-Fi and NR-U.

Hidden nodes may comprise a problem seen in Wi-Fi networks where two transmitters, which are not within carrier-sense range of each other, try to transmit, resulting in collisions at an intermediate node. Though generally discussed in the context of Wi-Fi networks, the hidden node problem may also manifest itself in the presence of mixed 5G and Wi-Fi (i.e., inter-protocol) networks for example. For Wi-Fi, the Energy Detect (ED) threshold may be at −62/−72 dBm. Also, for 5G NR-U, based on measurements from field and simulations (not mandated by the standard), a similar ED threshold for the gNB may be set at −72 dBm.

With respect to Wi-Fi Listen Before Talk (LBT) in the presence of 5G, any transmission coming from the 5G network may be detected if it reaches above −62/−72 dBm, or else it may not be considered for the Clear Channel Assessment (CCA) on the Wi-Fi transmitter. With respect to 5G NR-U LBT in the presence of Wi-Fi, NR-U (similar to Long Term Evolution (LTE), License Assisted Access (LAA), and New Radio (NR)) may be a base station driven network, and most category 4 LBT in NR-U may be performed by the gNB. Accordingly, similar to the above issue seen in Wi-Fi networks, from an NR-U perspective, if the Wi-Fi signal does not reach above the ED threshold of −72 dBm, these transmissions may be ignored. Consequently, if these ED thresholds are not met, transmissions from a Wi-Fi network may lead to a hidden node problem in a 5G NR-U deployment and vice-versa. It should also be noted that the Wi-Fi approach of using Ready to Send (RTS)/Clear to Send (CTS) may not work in these scenarios because the CTS may need to reach the 5G receiver at over −72 dBm. Embodiments of this disclosure provide processes to reduce the effect of this inter-protocol hidden node problem.

Figure 1:
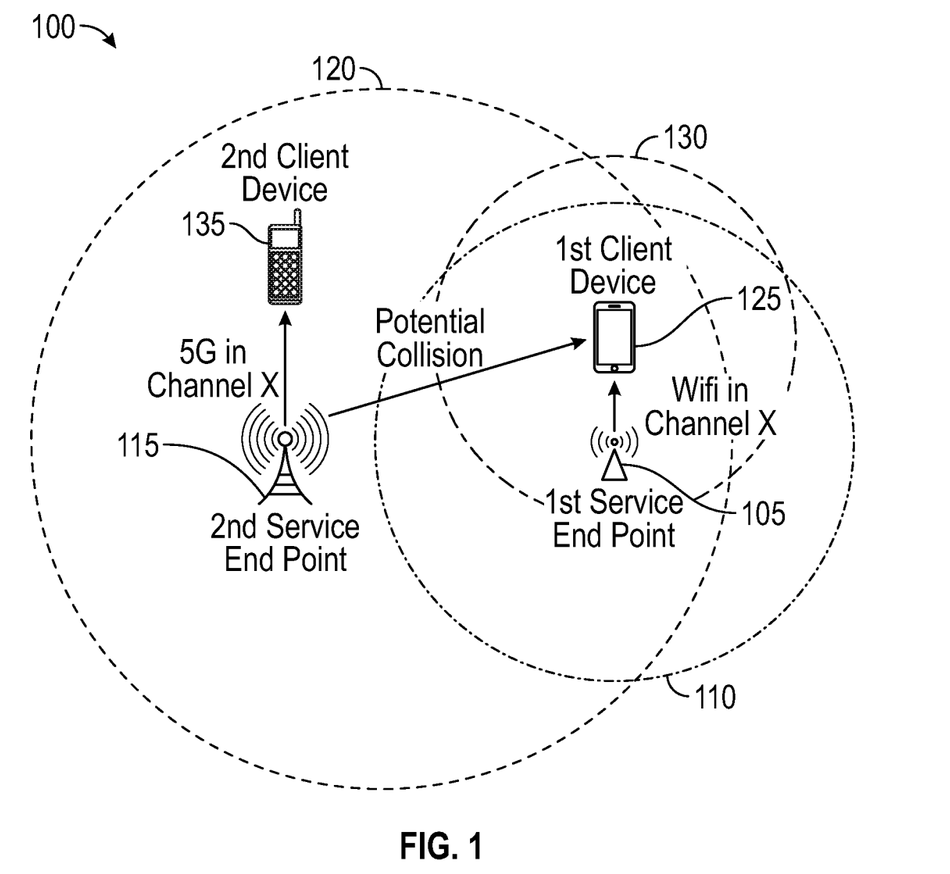
FIG. 1 is a block diagram of an operating environment.

FIG. 1 shows an operating environment 100. As shown in FIG. 1, operating environment 100 may comprise a first service end point 105 having a first service end point Energy Detect (ED) threshold 110, a second service end point 115 having a second service end point ED threshold 120, a first client device 125 having a first client device ED threshold 130, and a second client device 135. First service end point 105 and second service end point 115 may be controlled by the same entity (e.g., service provider) or may be controlled by different entities.

First client device 125 may associate with first service end point 105 and second client device 135 may associate with second service end point 115. First client device 125 and second client device 135 may comprise, but not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

First service end point 105 may comprise a wireless Access Point (AP) that may provide network access using Wi-Fi technology, via a Wireless Local Area Network (WLAN) using a router connected to a service provider. Second service end point 115 may comprise a device that may be connected to a cellular network and that may communicate directly and wirelessly with client devices. The cellular network may comprise, but is not limited to, a Long-Term Evolution (LTE) broadband cellular network, a Fourth Generation (4G) broadband cellular network, or a Fifth Generation (5G) broadband cellular network, operated by a service provider. For example, second service end point 115 may comprise an eNodeB (eNB) or a gNodeB (gNB).

First service end point 105 may operate using a different wireless standard than second service end point 115. For example, first service end point 105 may operate using the Institute of Electrical and Electronic Engineers (IEEE) 802.11 standard. In contrast, second service end point 115 may operate using the Long Term Evolution in Unlicensed spectrum (LTE-U) standard, the License Assisted Access (LAA) standard, or the MulteFire standard for example.

The hidden node problem may exist in Wi-Fi. In wireless networking, the hidden node problem or hidden terminal problem occurs when a node can communicate with a wireless AP, but cannot directly communicate with other nodes that are communicating with that AP. The Wi-Fi IEEE 802.11 RTS/CTS may comprise one handshake protocol that may be used to mitigate this problem. For example, a client device that wishes to send data may send an RTS packet. The AP may then send a CTS packet when it is ready for that particular client device. For short packets the overhead is quite large, so short packets may not use it. The minimum packet size may be configurable.

In addition to the hidden node problem in Wi-Fi, an inter-protocol (e.g., mixed 5G and Wi-Fi) hidden node problem may exist. According to regulations in unlicensed bands, a transmitter may need to perform CCA on unlicensed bands, and transmissions may take place if the channel is sensed to be idle. Although 3GPP has considered the same process (i.e., LBT) for NR-U, this process may invoke a Wi-Fi/5G hidden node problem. With conventional systems, there may be no processes for collision avoidance between NR-U and Wi-Fi networks. Therefore, an inter-protocol hidden node problem may cause issues in the operation of Wi-Fi and/or 5G when they are co-located.

As shown in FIG. 1, an inter-protocol hidden node problem could potentially be present but for embodiments of the disclosure. For example, first service end point 105 (e.g., an AP) and second service end point 115 (e.g., a gNB) may operate using different wireless standards, but may be operating on the same unlicensed channel. A packet transmission by second service end point 115 to second client device 135 may cause interference and collisions with the transmission by first service end point 105 to second client device 125. This issue may not be addressed by using RTS/CTS on the Wi-Fi side because the 5G LBT process of second service end point 115 may not sense the presence of Wi-Fi packet since the CTS does not reach second service end point 115 above the ED threshold (i.e., first service end point ED threshold 110).

A similar problem has the potential of occurring if it is instead the Wi-Fi devices that cannot hear the 5G transmissions above their ED threshold. So, the main reason for having a hidden node problem in the Wi-Fi network and/or the 5G NR-U is because the ED thresholds in each of these networks may be set agnostic to the presence of each other. As will be discussed in greater detail below with respect to FIG. 2 and FIG. 4, embodiments of the disclosure may cause the inter-protocol hidden node problem of operating environment 100 to be mitigated or eliminated.

Figure 2:
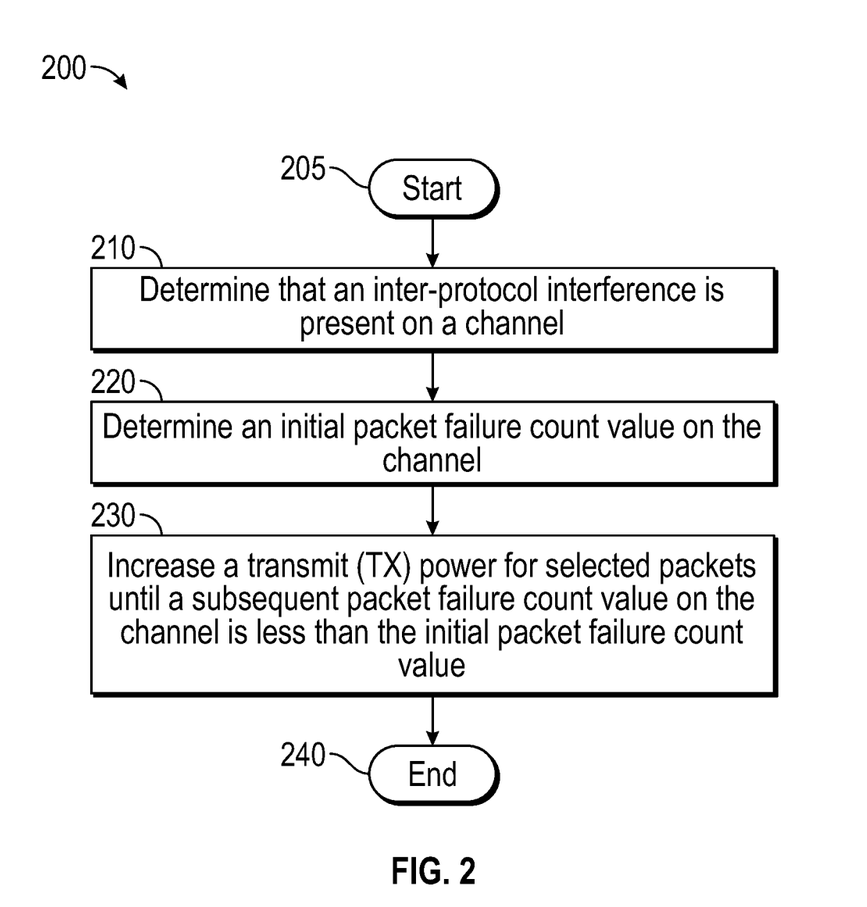
FIG. 2 is a flow chart of a method for providing inter-protocol interference reduction for hidden nodes.

FIG. 2 is a flow chart setting forth the general stages involved in a method 200 consistent with an embodiment of the disclosure for providing inter-protocol interference reduction for a hidden node. Method 200 may be implemented using a first service end point 105 (e.g., an AP) as described in more detail above with respect to FIG. 1. Notwithstanding, processes described by method 200 may be carried out remotely, for example, in a wireless controller or on the cloud. Ways to implement the stages of method 200 will be described in greater detail below.

Method 200 may begin at starting block 205 and proceed to stage 210 where first service end point 105 may determine that an inter-protocol interference is present on a channel (e.g., channel X). For example, to be able to detect an inter-protocol hidden node problem, first service end point 105 may identify that there is an inter-protocol interferer. The presence of 5G frames (e.g., NR-U frames) in unlicensed bands may be identified by a 5G monitoring radio. Embodiments of the disclosure may also include a 5G classifier module that may classify and determine the presence of a 5G gNB (e.g., second service end point 115) or a 5G UE (e.g., second client device 135). When no NR-U frames are detected, first service end point 105 may work in its normal operation. Because first service end point 105 may be within second service end point ED threshold 120, first service end point 105 may receive NR-U frames when first service end point 105 and second service end point 115 are using the same channel.

Embodiments of the disclosure may considered "rogue" and "non-rogue" peers. Therefore, the identified 5G frames (e.g., NR-U frames) may be identified as rogue or non-rogue. A query may be sent to a controller for identification of the rogue peer (e.g., gNB or UE). From the perspective of first service end point 105, a peer (e.g., second service end point 115) may be rogue if it is operated by an entity other than the entity that operates first service end point 105. First service end point 105 may consider a peer (e.g., second service end point 115) non-rogue if they are operated by the same entity. The 5G monitor radio may not need to decode the entire NR-U frame. Some basic information from the Physical Broadcast Channel (PBCH), for example, cell ID, or control channels (e.g., Physical Downlink Control Channel (PDCCH) or Physical Uplink Control Channel (PUCCH)) may be sufficient to determine that the frame comprises inter-protocol interference.

From stage 210, where first service end point 105 determines that the inter-protocol interference is present on the channel, method 200 may advance to stage 220 where first service end point 105 may determine an initial packet failure count value on the channel. For example, for evaluating the effect of Tx power adjustment (and ED threshold adjustment for non-rogue peers), a metric may be used. Consistent with embodiments of the disclosure, one metric may comprise the number of dropped or failed packets on the channel. This metric may be further filtered by only considering the clients with high Received Signal Strength Indicator (RSSI) to make sure that the packet drop is not resulting from a weak signal strength. The initial packet failure count value on the channel may be determined before making any Tx power adjustments or ED threshold adjustments (for non-rogue peers).

Once first service end point 105 determines the initial packet failure count value on the channel in stage 220, method 200 may continue to stage 230 where first service end point 105 may increase a transmit (Tx) power for selected packets until a subsequent packet failure count value on the channel is less than the initial packet failure count value. For example, when the peer (e.g., second service end point 115) is identified as rogue, the Tx power of some specific packets may be increased to enhance the chance of eliminating the hidden node problem. The Tx power for the selected packets may be iteratively increased by a predetermined value at each iteration and the packet failure count value may be re-determined for each iteration. Once the subsequent packet failure count value on the channel is less than the initial packet failure count value, the Tx power used for the last iteration may be used by first service end point 105 for selected packets moving forward. The Tx power may be capped at a maximum level to ensure the power increase of RTS/CTS packets may not cause problems in first service end point 105's own network.

By increasing the Tx power of first service end point 105 to cause these selected packets to be seen by second service end point 115, second service end point 115 is made aware of first service end point 105. Because second service end point 115 may now be aware of first service end point 105, second service end point 115 may back off and keep the channel unused for first service end point 105 transmissions. This Tx power increase may be done on selected packets, for example, RTS/CTS packets that may be used to set navigation (NAV) markers in the Wi-Fi network. Although second service end point 115 may not be able to decode these packets, this process may increase the chance of back off and keep the channel unused for first service end point 105.

In addition to the process described above with respect to stage 230 that may be used when the peer is rogue, when the peer is non-rogue, adjustments in addition to the ones described above may be made. For example, these additional adjustments may comprise adjusting (i.e., reducing) second service end point ED threshold 120. This may be accomplished in the non-rogue case because second service end point 115 and first service end point 105 may be controlled by the same entity. This ED threshold adjustment may be done in conjunction with the iterative Tx power increases and where the packet failure count value may be re-determined for each iteration as described above. ED threshold adjustment may be based on the RSSI of the inter-protocol frames and/or other channel measurements to avoid transmitting at the same time as the non-rogue peer. This can be either computed centrally (by cloud/controller aware of both the 5G and Wi-Fi deployments) or independently. As a result, first service end point ED threshold 110 and first client device ED threshold 130 may be increased to reduce the chance of the hidden node problem. Once first service end point 105 increases the Tx power for selected packets until the subsequent packet failure count value on the channel is less than the initial packet failure count value in stage 230, method 200 may then end at stage 240.

Consistent with other embodiments of the disclosure, the Tx power adjustment may be accomplished by switching to Extended Range PHY (ERP) format mode for the rogue peer case. For example, once the inter-protocol hidden node problem is determined to exist, first service end point 105 may switch to the ERP format mode. This ERP format mode was introduced in IEEE 802.11ax to provide higher reliability of the preamble by boosting the power by 3 dB and repeating HE-LTF and HE-SIGs. With this packet format, the chance of reaching second service end point 115 may be increased to keep the channel unoccupied for Wi-Fi transmission. If the performance metric (e.g., dropped packets) is not changed by switching to the ERP format mode, the 3 dB power increase may not be enough of a power increase and first service end point 105 may switch away from the ERP format mode and return to its normal mode.

Figure 3:
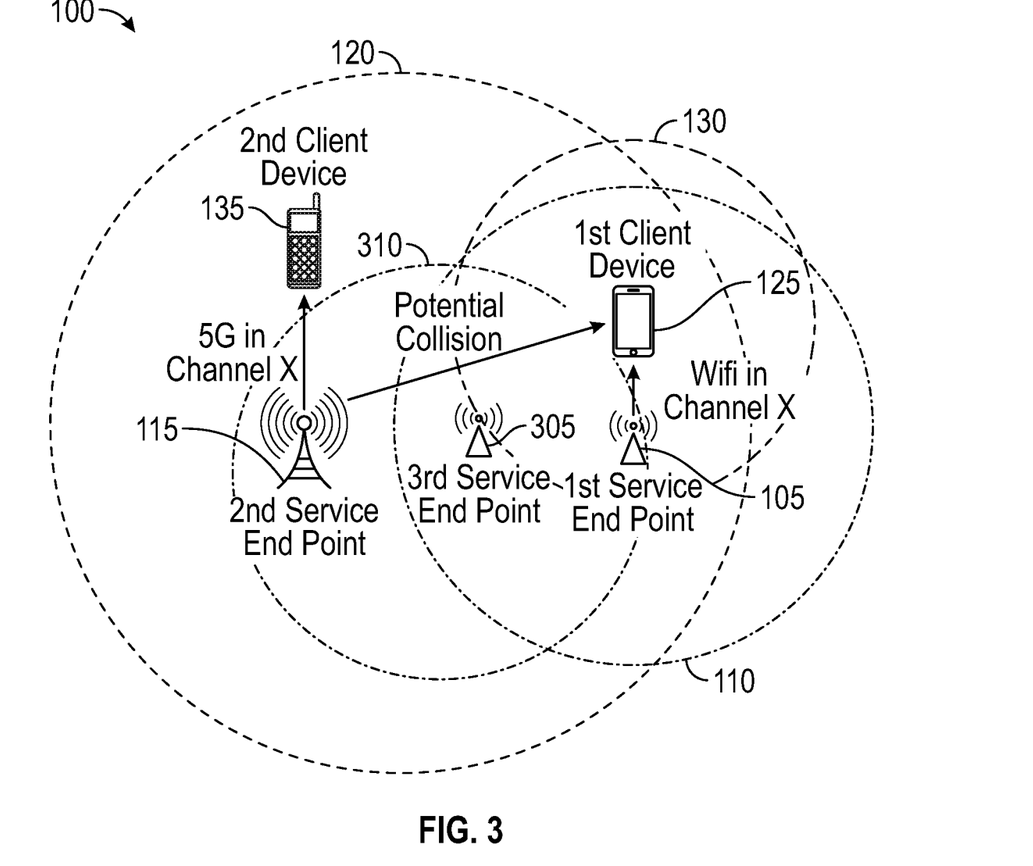
FIG. 3 is a block diagram of an operating environment.

FIG. 3 shows operating environment 100. In addition to what is shown in FIG. 1, as shown in FIG. 3, operating environment 100 may further comprise a third service end point 305 having a third service end point ED threshold 310. Similar to first service end point 105, third service end point 305 may comprise a wireless AP that may provide network access using Wi-Fi technology, via a Wireless Local Area Network (WLAN) using a router connected to a service provider. Third service end point 305 may operate using a different wireless standard than second service end point 115. Third service end point 305 may operate using the same wireless standard as first service end point 105.

First service end point 105 and third service end point 305 may be controlled by the same entity (e.g., service provider) while second service end point 115 may be controlled by a different entity. First service end point 105 and second service end point 115 may be within third service end point ED threshold 310. Third service end point 305 may be within both first service end point ED threshold 110 and second service end point ED threshold 120.

The elements described above of operating environment 100 (e.g., first service end point 105, second service end point 115, third service end point 305, first client device 125, and second client device 135) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 4:
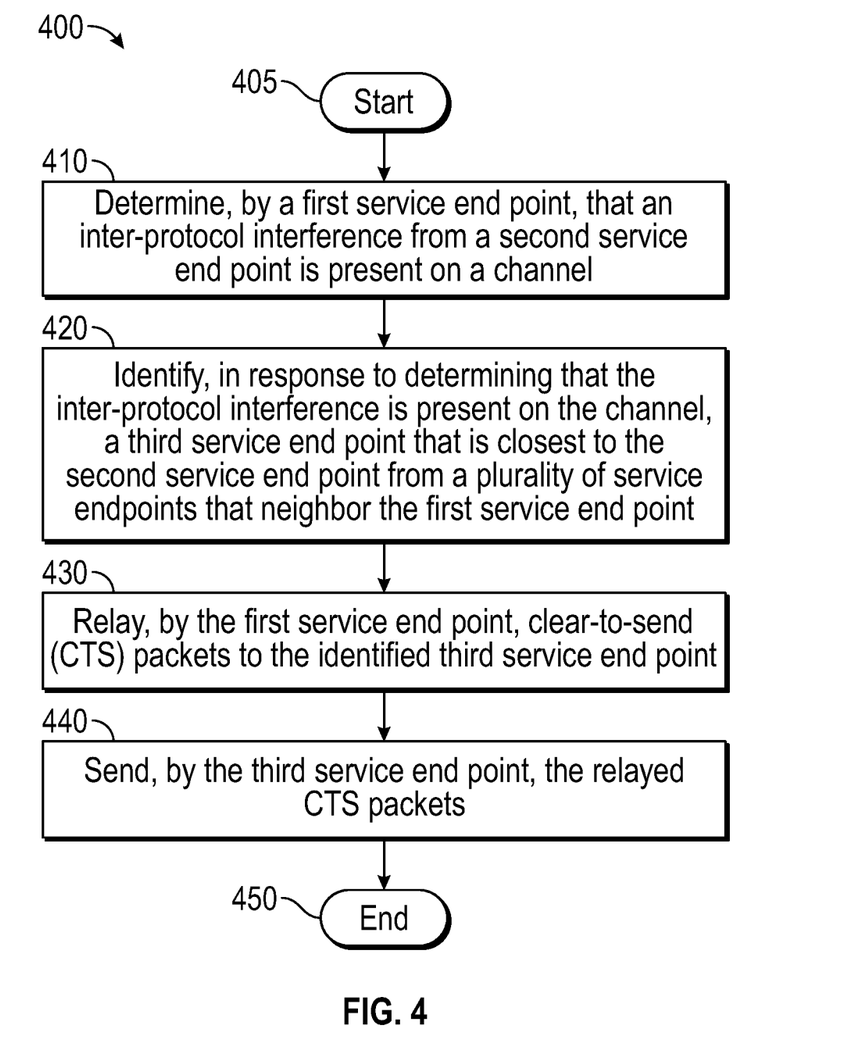
FIG. 4 is a flow chart of a method for providing inter-protocol interference reduction for hidden nodes.

FIG. 4 is a flow chart setting forth the general stages involved in a method 400 consistent with embodiments of the disclosure for providing inter-protocol interference reduction for hidden nodes. Method 400 may be implemented using first service end point 105 (e.g., an AP) and third service end point 305 (e.g., an AP) as described in more detail above with respect to FIG. 1 and FIG. 3. Ways to implement the stages of method 400 will be described in greater detail below.

Method 400 may begin at starting block 405 and proceed to stage 410 where first service end point 105 may determine that an inter-protocol interference from second service end point 115 (e.g., a gNB) is present on a channel. For example, as described above with respect to stage 210, to be able to detect the inter-protocol hidden node problem, first service end point 105 may identify that there is an inter-protocol interferer. The presence of 5G frames (e.g., NR-U frames) in unlicensed bands may be identified by a 5G monitoring radio. Embodiments of the disclosure may also include a 5G classifier module that may classify and determine the presence of a 5G gNB (e.g., second service end point 115) or a 5G UE (e.g., second client device 135). When no NR-U frames are detected, first service end point 105 may work in its normal operation. Because first service end point 105 may be within second service end point ED threshold 120, first service end point 105 may receive NR-U frames when first service end point 105 and second service end point 115 are using the same channel.

From stage 410, where first service end point 105 determines that the inter-protocol interference from second service end point 115 is present on the channel, method 400 may advance to stage 420 where first service end point 105 may identify, in response to determining that the inter-protocol interference is present on the channel, third service end point 305 that is closest to second service end point 115 from a plurality of service endpoints that neighbor first service end point 105. For example, increasing the transmit power of CTS packets for first service end point 105 may cause extra overhead to its own Wi-Fi network. Consistent with embodiments of the disclosure, an Auxiliary (AUX) radio (i.e., RHL) of an AP (e.g., third service end point 305) that has an ED that covers second service end point 115 may be leveraged by first service end point 105. Once the presence of NR-U frames (i.e., inter-protocol interference) in a certain channel of the hidden node (i.e., first service end point 105) is determined, a request for similar searches in neighbor cells may be performed in the same channel. Based on the received power, it may be determined which AP is closer to second service end point 115. It is likely that the AP closer to second service end point 115 has an ED that covers second service end point 115.

Once first service end point 105 identifies, in response to determining that the inter-protocol interference is present on the channel, third service end point 305 that is closest to second service end point 115 from the plurality of service endpoints that neighbor first service end point 105 in stage 420, method 400 may continue to stage 430 where first service end point may relay CTS packets to identified third service end point 305. For example, the out-of-range AP (i.e., first service end point 105) may transmit CTS packets to third service end point 305 so that the AUX radio of third service end point 305 may be used in a relay process to second service end point 115.

After first service end point relays CTS packets to identified third service end point 305 in stage 430, method 400 may proceed to stage 440 where third service end point may send the relayed CTS packets. For example, when the out-of-range AP (i.e., first service end point 105) transmits CTS packets, the AUX radio of the AP (i.e., third service end point 305) in the vicinity of second service end point 115 may be used as a relay and it may send the CTS-to-self packet based on received CTS packets from first service end point 105. Therefore, the 5G network (e.g., second service end point 115) may back off and the original AP (i.e., first service end point 105) may transmit it's packets.

To prevent interfering CTS-to-self on the packet transmission from the original AP (i.e., first service end point 105), proper beamforming on the AUX radio may be used to minimize the received power at the destination by putting it in a null space of third service end point 305. A more aggressive way of sending CTS-to-self may be retransmission with beamforming while the Aggregate MAC Protocol Data Unit (AMPDU) may be taking the channel to make sure that the 5G network does not try to occupy the channel during this time. Once third service end point sends the relayed CTS packets in stage 440, method 400 may then end at stage 450.

Figure 5:
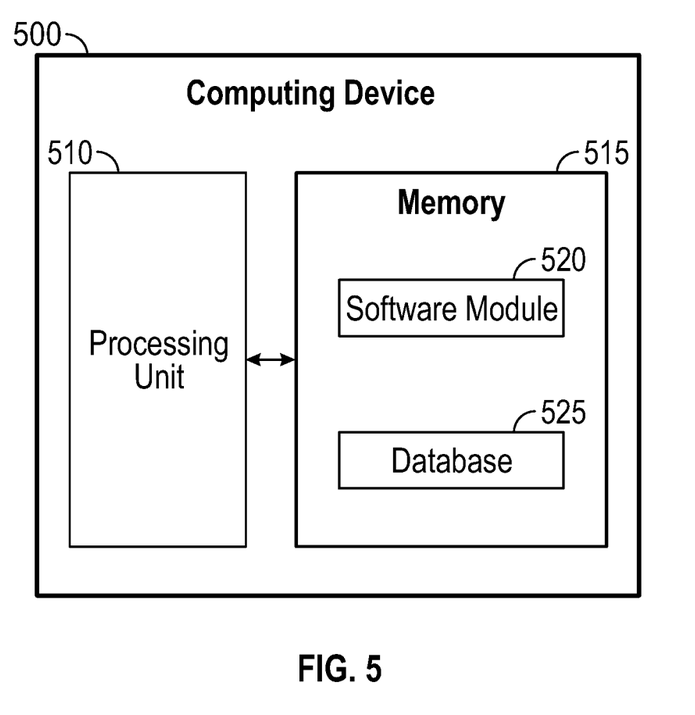
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing inter-protocol interference reduction for hidden nodes as described above with respect to FIG. 2 and FIG. 4. Computing device 500, for example, may provide an operating environment for first service end point 105, second service end point 115, third service end point 305, first client device 125, and second client device 135. First service end point 105, second service end point 115, third service end point 305, first client device 125, and second client device 135 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a first service end point, that an inter-protocol interference is present on a channel;
    determining, in response to determining that the inter-protocol interference is present on the channel, that the inter-protocol interference originated from a second service end point;
    determining, in response to determining that the inter-protocol interference originated from the second service end point, that the second service end point is not a rogue end point, wherein determining that the second service end point is not a rogue end point comprises determining that the service second end point is being controlled by an entity that also controls the first service end point;
    determining, in response to determining that the second service end point is not a rogue end point, an initial packet failure count value on the channel; and
    increasing, in response to determining that the second service end point is not a rogue end point, a transmit (Tx) power for selected packets until a subsequent packet failure count value on the channel is less than the initial packet failure count value.

2. The method of claim 1, further comprising limiting the Tx power to a maximum level.

3. The method of claim 1, wherein the selected packets comprises at least one of: Ready-To-Send (RTS) packets and Clear-To-Send (CTS) packets.

4. The method of claim 1, further comprising:
    reducing, in response to determining that the second service end point is a rogue end point, an Energy Detect (ED) range threshold of a Listen Before Talk (LBT) process of the second service end point in response to determining that the inter-protocol interference originated from the second service end point controlled by the entity that controls the first service end point.

5. The method of claim 4, further comprising increasing an ED range threshold of an LBT process of the first service end point.

6. The method of claim 1, wherein the first service end point comprises a wireless Access Point (AP).

7. The method of claim 1, wherein a second service end point is a source of the inter-protocol interference, and wherein the second service end point comprises one of: an eNodeB (eNB) and a gNodeB (gNB).

8. The method of claim 1, wherein the first service end point operates using a first standard and the second service end point operates using a second standard.

9. The method of claim 8, wherein the first standard comprises
    Institute of Electrical and Electronic Engineers (IEEE) 802.11 standard.

10. The method of claim 8, wherein the second standard comprises one of: Long Term Evolution in Unlicensed spectrum (LTE-U) standard; License Assisted Access (LAA) standard; and MulteFire standard.

11. A system comprising:
    a memory storage; and
    a processing unit disposed in a first service end point and coupled to the memory storage, wherein the processing unit is operative to:
    determine that an inter-protocol interference is present on a channel;
    determine, in response to determining that the inter-protocol interference is present on the channel, that the inter-protocol interference originated from a second service end point;
    determine, in response to determining that the inter-protocol interference originated from the second service end point, that the second service end point is not a rogue end point, wherein the processing unit being operative to determine that the second service end point is not a rogue end point comprises the processing unit being operative to determine that the service second end point is being controlled by an entity that also controls the first service end point;

determine, in response to determining that the second service end point is not a rogue end point, an initial packet failure count value on the channel;

increase, in response to determining that the second service end point is not a rogue end point, a transmit (Tx) power by a predetermined value for transmission of packet preambles in response to determining that the inter-protocol interference is present on the channel; and maintain the increased Tx power at the predetermined value for transmission of the packet preambles when a subsequent packet failure count value on the channel is less than the initial packet failure count value.

12. The system of claim 11, wherein the processing unit being operative to increase the transmit Tx power by the predetermined value for transmission of the packet preambles comprises the processing unit being operative to operate the first service end point in an Extended Range PHY (EPR) format.

13. The system of claim 11, wherein the first service end point operates using a first standard and the second service end point operates using a second standard.

14. The system of claim 13, wherein the first standard comprises Institute of Electrical and Electronic Engineers (IEEE) 802.11 standard and wherein the second standard comprises one of: Long Term Evolution in Unlicensed spectrum (LTE-U) standard; License Assisted Access (LAA) standard; and MulteFire standard.

15. The system of claim 11, wherein the predetermined value comprises 3 dB.

16. A non-transitory computer-readable medium that stores a set of instructions which when executed perform a method comprising:

determining, by a first service end point, that an inter-protocol interference from a second service end point is present on a channel;

identifying, in response to determining that the inter-protocol interference is present on the channel, a third service end point that is closest to the second service end point from a plurality of service endpoints that neighbor the first service end point and operate in a same standard as the first service end point, wherein the second service end point operate in a different standard from each of the first service end point and the third service end point;

relaying, by the first service end point, Clear-To-Send (CTS) packets to the identified third service end point; and sending, by the third service end point, the relayed CTS packets.

17. The non-transitory computer-readable medium of claim 16, wherein sending the relayed CTS packets comprises sending the CTS packets by an auxiliary radio in the third service end point.

18. The non-transitory computer-readable medium of claim 16, wherein the first service end point and the third service end point operates using a first standard and the second service end point operates using a second standard.

19. The non-transitory computer-readable medium of claim 18, wherein the first standard comprises Institute of Electrical and Electronic Engineers (IEEE) 802.11 standard.

20. The non-transitory computer-readable medium of claim 18, wherein the second standard comprises one of: Long Term Evolution in Unlicensed spectrum (LTE-U) standard; License Assisted Access (LAA) standard; and MulteFire standard.

* * * * *